United States Patent
Petry et al.

[11] Patent Number: 5,273,330
[45] Date of Patent: Dec. 28, 1993

[54] TWIST-LOCK MOUNTING ASSEMBLY AND METHOD FOR A BUMPER ENERGY ABSORBER

[75] Inventors: Ronald G. Petry, Xenia, Ohio; Richard R. Lovelace, Clarkston, Mich.; Karl D. Freeman, Centerville; Francis W. Barton, Waynesville, both of Ohio

[73] Assignee: General Motors Corporation, Detroit, Mich.

[21] Appl. No.: 980,045

[22] Filed: Nov. 23, 1992

[51] Int. Cl.⁵ .............................................. B60R 19/08
[52] U.S. Cl. .................................... 293/132; 293/133; 293/135; 293/134
[58] Field of Search ............... 293/132, 134, 135, 136, 293/137, 133

[56] References Cited

U.S. PATENT DOCUMENTS

| | | | |
|---|---|---|---|
| 3,880,455 | 4/1975 | Toemmeraas | 293/134 |
| 4,097,080 | 6/1978 | Petry | 293/85 |
| 4,303,267 | 12/1981 | Häberle et al. | 293/155 |
| 4,509,781 | 4/1985 | Dick et al. | 293/104 |
| 4,770,453 | 9/1988 | Reynolds | 293/119 |
| 4,830,417 | 5/1989 | Bates et al. | 293/134 |
| 4,830,418 | 5/1989 | Gest | 293/134 |
| 4,893,857 | 1/1990 | Bobinger et al. | 293/136 |
| 4,934,749 | 6/1990 | Folarin | 293/134 |
| 4,995,660 | 2/1991 | Horansky et al. | 293/132 |
| 5,116,092 | 5/1992 | Schönleber | 293/132 |

Primary Examiner—Robert R. Song
Attorney, Agent, or Firm—A. Michael Tucker

[57] ABSTRACT

The present invention includes a mounting assembly for securing an energy absorber unit to vehicular support. A collar having a hub portion is secured to the energy absorber. The hub portion includes at least one circumferential ramp and flange. A mounting plate having at least one tab is secured to the vehicular support. As the collar is placed adjacent the mounting plate, the ramp is rotated into a slip fit with the tab. Preferably, a locking projection of the mounting plate is received in an opening on the flange of the collar to prevent inadvertent rotation of the collar out of a secured position. Also, an alignment key and notch can be formed on the mounting plate and collar, respectively, to facilitate proper orientation of the collar during installation.

17 Claims, 3 Drawing Sheets

TWIST-LOCK MOUNTING ASSEMBLY AND METHOD FOR A BUMPER ENERGY ABSORBER

BACKGROUND OF THE INVENTION

1. Field of the Invention

The present invention relates generally to vehicular bumpers, and in particular is concerned with a mounting assembly for quickly attaching an energy absorber unit to a vehicular support.

2. Description of the Related Art

Energy absorber units for mounting vehicular bumpers are well-known. Generally, a pair of identical energy absorber units attached to the end portions of side rails or other vehicular supports mounts the bumper outwardly of the body for movement between extended and collapsed positions. Each energy absorber unit includes a telescoping tube slidably received in a base tube. During a low-speed impact to a bumper, the energy absorber unit collapses, thereby permitting the bumper to move towards the body while absorbing the energy of the impact. After the impact force is removed, the energy absorber unit biases the bumper back to its preimpact position.

Many conventional mounting techniques require various brackets and fasteners to secure an energy absorber to a frame. In addition to the cost of parts, such brackets and fasteners increase the labor time required for assembly. Examples of energy absorber units requiring a bracket and fasteners for mounting can be found in U.S. Pat. Nos. 4,509,781, 4,830,417 and 4,830,418.

The art continues to seek improvements. It is desirable to provide quick and economical means for attaching an energy absorber unit to a frame. Furthermore, it is desirable to provide an alignment feature to facilitate proper orientation of an energy absorber unit during installation.

SUMMARY OF THE INVENTION

The present invention includes a vehicular bumper system having a pair of energy absorbing units mounted between a bumper assembly and support structure. A mounting assembly provides a quick and economical method for manually securing the energy absorber units to support structure without the use of fasteners. An alignment feature of the mounting assembly insures proper orientation of the energy absorber units. Also, retention elements prevent the energy absorber units from inadvertently rotating out of a secured position.

In a preferred embodiment, the present invention includes a mounting assembly for securing an energy absorber unit to vehicular support. A collar having a hub portion is secured to the energy absorber. The hub portion includes at least one circumferential ramp and flange. A mounting plate having at least one tab is secured to the vehicular support. As the collar is placed adjacent the mounting plate, the ramp is rotated into a slip fit with the tab. Preferably, a locking projection of the mounting plate is received in an opening on the flange of the collar to prevent inadvertent rotation of the collar out of a secured position. Also, an alignment key and notch can be formed on the mounting plate and collar, respectively, to facilitate proper orientation of the collar during installation.

DETAILED DESCRIPTION OF THE PREFERRED EMBODIMENT

Figure 1:
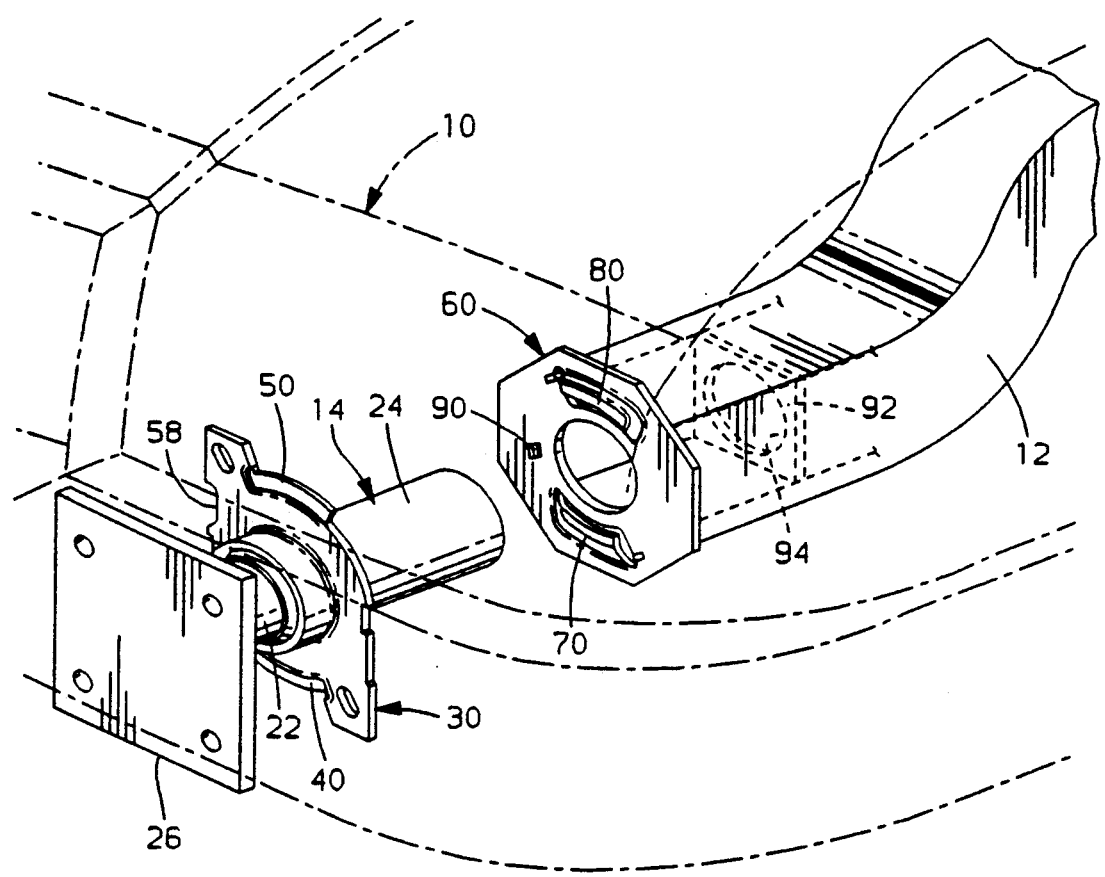
FIG. 1 is an exploded perspective view of a preferred embodiment of the present twist-lock mounting assembly including a collar and a retaining plate for attaching an energy absorber unit between a bumper assembly and a vehicular support illustrated as a left-hand side rail.

A forward portion of a vehicle indicated generally at 10 is schematically illustrated as an automobile in FIG. 1. A left-hand side rail 12 is laterally-spaced from a right-hand side rail (not illustrated) in a well-known manner. A telescopic energy absorber unit 14 is secured between the side rail 12 and a bumper assembly 16. The bumper assembly 16 laterally spans the front of the vehicle 10 and is supported on the right-hand portion by a second energy absorber unit (not illustrated) secured between the right-hand rail and the bumper assembly 16. While the illustrated bumper assembly 16 includes an impact bar 18 and a fascia 20, its is appreciated the present invention can also be used with other bumper assemblies, including hard bar bumper systems.

The energy absorber unit 14 includes a forwardly-projecting inner cylinder 22 which is mounted for limited telescopic sliding movement within an outer cylinder 24. A mounting plate 26 is secured to the forward end of the inner cylinder 22 by suitable means including an annular weld. The mounting plate 26 is secured to the impact bar 18 by suitable means including fasteners 29.

Upon impact to the impact bar 18, the inner cylinder 22 slides into the outer cylinder 24. The energy absorber unit 14 includes means to absorb impact energy and as is common in the art, the energy absorbing means may be hydraulic, pneumatic, a compressible composition, or other suitable materials. After the impact force is dissipated, the bumper assembly 16 is returned to its approximate original position by the energy absorber units 14.

Figures 2A, 2B:
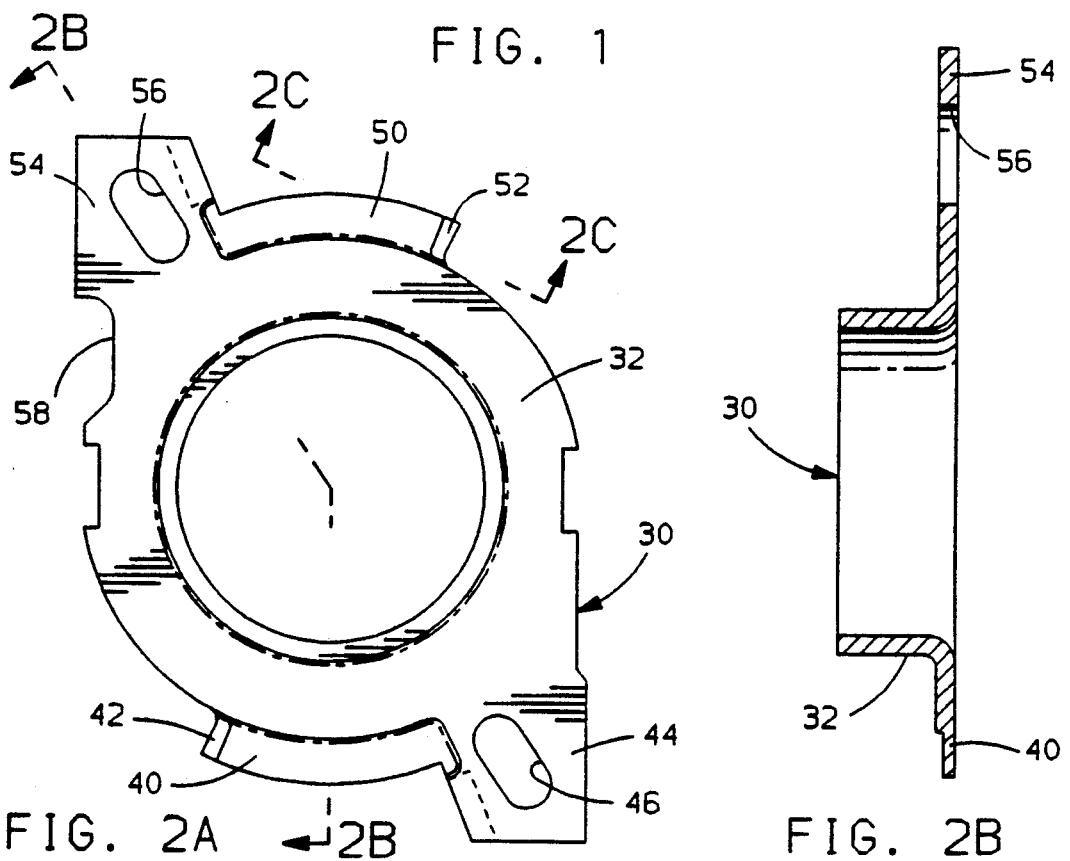
FIG. 2A is a front elevational view of the present collar removed from the energy absorber unit for clarity of illustration.
FIG. 2B is a sectional view taken along line 2B—2B of FIG. 2A.
Figures 2C, 3A, 3B, 3C, 3D:
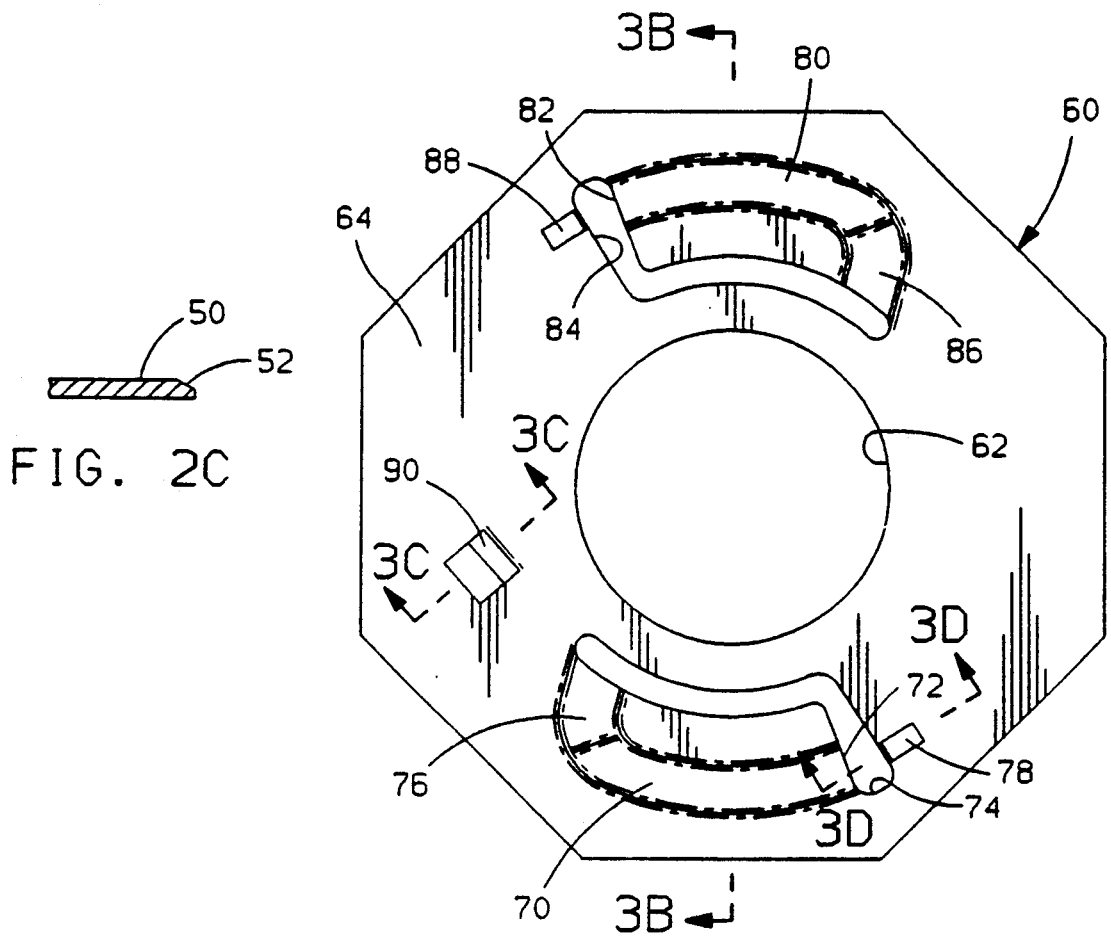
FIG. 2C is a sectional view taken along line 2C of FIG. 2A illustrating a coined leading edge of a locking ramp on the collar.
FIG. 3A is a front elevational view of the present retaining plate removed from the side rail for clarity of illustration.
FIG. 3B is a sectional view taken along line 3B—3B of FIG. 3A.
FIG. 3C is a sectional view taken along line 3C—3C of FIG. 3A illustrating an alignment key.
FIG. 3D is a sectional view taken along line 3D of FIG. 3A illustrating a locking projection formed in the retaining plate.

A collar 30 includes a hub portion 32 attached to the outer cylinder 24 by suitable means including welding or brazing. Preferably, a pair of diametrically-opposed arcuate locking ramps 40, 50 are formed at the periphery of the hub portion 32. In a preferred embodiment, ramp 40 originates at a coined or beveled end 42, and ramp 50 has a similar coined leading end 52 (FIG. 2C). Ramp 40 terminates in a flange 44 extending beyond the periphery of the ramp 40 and including an opening 46.

Ramp 50 terminates in a flange 54 extending beyond the periphery of the ramp 50 and including an opening 56. An alignment notch 58 is formed in flange 54 opposite ramp 50.

A retaining plate 60 includes a central opening 62 for receiving the outer cylinder 24 as described below. The retaining plate 60 is secured to the side rail 12 or another selected body support by any suitable means. The retaining plate 60 includes a front surface 64 and a rear surface 66, and first and second tabs 70, 80 for receiving respective locking ramps 40, 50 of the collar 30. The first tab 70 projects away from the front surface 64 (FIG. 3B) and includes a forward edge 72 adjacent a slot 74 and a rearward edge 76 merging into the retaining plate 60.

Adjacent slot 74 and opposite forward edge 72, a locking projection 78 is formed in the retaining plate 60 and projects slightly upwardly from the front surface 64 (FIG. 3D). Adjacent slot 84 and opposite forward edge 82, a locking projection 88 is formed in the retaining plate 60 and projects slightly upwardly from the front surface 64. At a preselected clockwise position beyond the rearward edge 76 of the first tab 70, an alignment key 90 is turned upwardly from the front surface 64 (FIG. 3C).

A receptacle plate 92 includes a central opening 94 and is preferably positioned inside the side rail 12 at a predetermined position. The receptacle plate 92 is secured to the side rail 12 by suitable means including welding.

To attach the energy absorber unit 14 to the side rail 12, the outer cylinder 24 is passed through the central opening 62 in the retaining plate 60 and inserted into the central opening 94 of the receptacle plate 92. The receptacle plate 92 acts as an anchor and stabilizer for the rear end of the energy absorber unit 14. It is appreciated that other means, including brackets and fasteners, can anchor the rear end of energy absorber unit 14.

As the outer cylinder 24 is inserted into openings 62 and 94, the energy absorber unit 14 is rotated so that the alignment notch 58 is positioned outwardly from the alignment key 90. In this position, the collar 30 is pressed against the front surface 64 of the retaining plate 60 and rotated in a clockwise direction. As rotation begins, the first locking ramp 40 enters slot 74 and is pressed underneath the first tab 70. Simultaneously, the second locking ramp 50 enters slot 82 and is pressed underneath the second tab 80. The coined leading edges 42, 52 of the locking ramps 40, 50 facilitate the fit between respective ramps 40, 50 and tabs 70, 80. The ramps 40, 50 and tabs 70, 80 can be designed so that a slip fit results as the collar 30 is rotated until the leading edges 42, 52 encounter the rearward edges 76, 86 of the tabs 70, 80. In this manner, the energy absorber 14 is secured to the side rail 12 in an economical and efficient manner without the use of fasteners.

Figure 4:
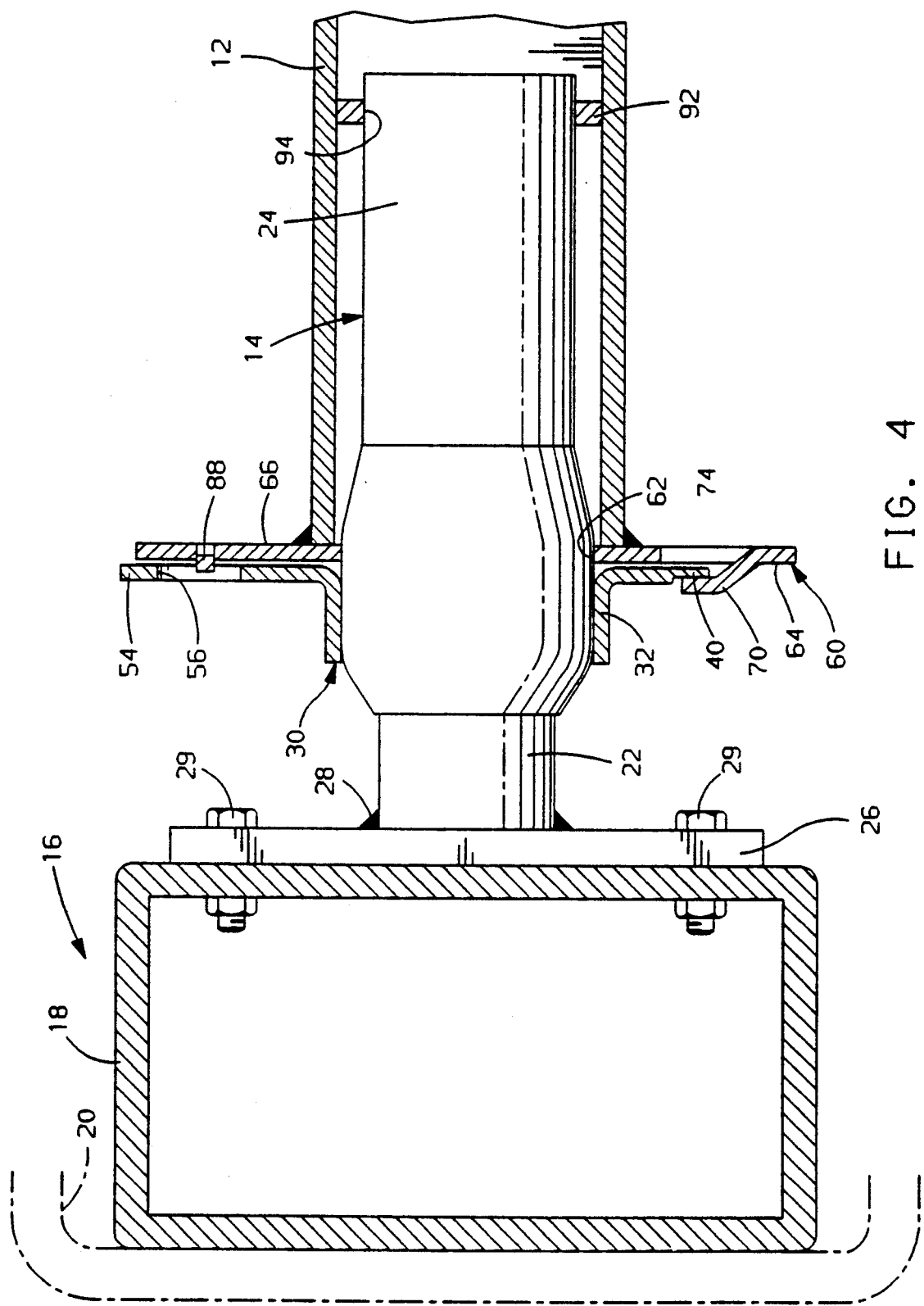
FIG. 4 is a side elevational view of the energy absorber unit after installation on the side rail by the collar and retaining plate.

The fit between the collar 30 and the retaining plate 60 can be secured with the present locking projections 78, 88. As the ramps 40, 50 are rotated fully in respective slots 74, 84, the locking projection 78 adjacent slot 74 projects upwardly into opening 46 of flange 44. Simultaneously, the locking projection 88 adjacent slot 82 projects upwardly into opening 56 of flange 54 (FIG. 4). The locking projections 78, 88 assure the retention of the collar 30 on the retaining plate 60, and thus the mounting of the energy absorber unit 14 on the side rail 12.

While a description of mounting the left-hand energy absorber unit 14 has been given, it is understood a similar mounting occurs for the right-hand energy absorber unit to fully attach the bumper assembly 16 to the vehicle 10.

The alignment notch 58 and key 90 provide efficient means for properly aligning the collar 30 and retaining plate 60. The locking projections 78, 88 prevent the collar 30 (and the energy absorber unit 14) from inadvertently rotating out of a secured position on the retaining plate 60. An installer can rotate the energy absorber unit 14 manually to produce the fit between the ramps 40, 50 and the tabs 70, 80, thereby securing the energy absorber unit 14 to the side rail 12.

Although the present invention has been described with reference to a preferred embodiment, workers skilled in the art will recognize that changes may be made in form and detail without departing from the spirit and scope of the invention. For example, in the preferred embodiment, a pair of locking ramps 40, 50, which act as male locking means, are illustrated mating with a pair of tabs 70, 80, which perform as female locking means. In other embodiments, one or more than two ramps can be formed on the collar 30, with a complementary number of tabs formed on the retaining plate 60. In still other embodiments, a female locking means may be formed on the collar 30 to mate with male locking means on the retaining plate 60. Similarly, the alignment key may be formed on the collar 30, and the alignment notch may be formed on the retaining plate 60.

We claim:

1. A vehicular bumper assembly to be mounted on a vehicular support without the use of fasteners, the assembly comprising:
   (a) an impact bar;
   (b) an energy absorber unit having a first end attached to the impact bar and a second end received by the support;
   (c) a collar fixedly secured to the energy absorber unit having either male or female integral locking means; and
   (d) a retainer plate, fixedly secured to the support, having an opening receiving the energy absorber unit and opposite female or male integral locking means cooperating with the locking means of the collar to lock the energy absorber unit to the vehicular support.

2. The bumper assembly specified in claim 1 wherein:
   (a) the male locking means includes at least one ramp; and
   (b) the female locking means includes at least one tab for receiving the ramp.

3. The bumper assembly specified in claim 2 wherein the ramp includes a coined leading edge.

4. The bumper assembly specified in claim 1 including means to align the collar with the retaining plate prior to the cooperation of the male and female locking means.

5. The bumper assembly specified in claim 1 wherein:
   (a) the male locking means includes at least one circumferential flange having an opening; and
   (b) the female locking means includes at least one projection which is received in the opening of the flange.

6. The bumper assembly specified in claim 5 wherein:
   (a) the male locking means includes an alignment notch; and (b) the female locking means includes an alignment key.

7. The bumper assembly specified in claim 1 including means to anchor the second end of the energy absorber unit on the vehicular support.

8. The bumper assembly specified in claim 7 wherein the means to anchor the energy absorber unit includes a receptacle plate having a central opening.

9. The bumper assembly specified in claim 1 wherein the energy absorber unit includes an inner cylinder telescopically received in an outer cylinder.

10. An assembly for mounting a bumper energy absorber unit to a vehicular side rail, comprising:
    (a) a collar having a hub portion secured to the energy absorber unit and at least one locking ramp; and
    (b) a retaining plate, secured to the side rail, having an opening for receiving the energy absorber unit and at least one tab, whereby the locking ramp is rotated into a slip fit with the tab to attach the energy absorber unit to the side rail.

11. The assembly specified in claim 10 wherein the locking ramp includes a coined leading edge.

12. The assembly specified in claim 10 wherein:
    (a) the collar includes at least one flange having an opening; and
    (b) the retaining plate includes at least one projection which is received in the opening of the flange when the ramp is fully rotated with respect to the tab.

13. The assembly specified in claim 10 including means to align the collar with the retaining plate.

14. The assembly specified in claim 13 wherein:
    (a) the collar includes an alignment notch; and
    (b) the retaining plate includes an alignment key.

15. A method for mounting a bumper energy absorber unit to vehicular support, the method comprising the steps of:
    (a) forming a collar having male locking means including at least one ramp;
    (b) forming a retainer plate having an opening for receiving the energy absorber unit and female locking means including at last one raised tab;
    (c) fixedly securing the collar to the energy absorber unit;
    (d) fixedly securing the retaining plate to the vehicular support;
    (e) passing the energy absorber unit through the opening of the retaining plate to position the collar against the retaining plate; and
    (f) rotating the collar so that the ramp forms a slip fit against the tab, thereby mounting the collar on the retaining plate.

16. The method specified in claim 15 including the steps of:
    (a) forming an alignment notch in the collar;
    (b) forming an alignment key in the retaining plate; and
    (c) aligning the notch with the key prior to rotating the ramp into the tab.

17. The method specified in claim 15 including the step of coining a leading edge of ramp prior to rotating the collar.

* * * * *